United States Patent
Chupeau et al.

(10) Patent No.: US 12,482,141 B2
(45) Date of Patent: Nov. 25, 2025

(54) METHOD AND APPARATUS FOR ENCODING, TRANSMITTING AND DECODING VOLUMETRIC VIDEO

(71) Applicant: INTERDIGITAL CE PATENT HOLDINGS, SAS, Paris (FR)

(72) Inventors: Bertrand Chupeau, Rennes (FR); Renaud Dore, Rennes (FR); Franck Thudor, Rennes (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 533 days.

(21) Appl. No.: 17/765,558

(22) PCT Filed: Sep. 28, 2020

(86) PCT No.: PCT/EP2020/077103
§ 371 (c)(1),
(2) Date: Mar. 31, 2022

(87) PCT Pub. No.: WO2021/063887
PCT Pub. Date: Apr. 8, 2021

(65) Prior Publication Data
US 2022/0343549 A1    Oct. 27, 2022

(30) Foreign Application Priority Data
Oct. 2, 2019 (EP) .................... 19306264

(51) Int. Cl.
*G06T 9/00* (2006.01)
*H04N 19/17* (2014.01)
(Continued)

(52) U.S. Cl.
CPC ............. *G06T 9/001* (2013.01); *H04N 19/17* (2014.11); *H04N 19/182* (2014.11);
(Continued)

(58) Field of Classification Search
CPC ...... G06T 9/001; H04N 19/17; H04N 19/182; H04N 19/186; H04N 19/30; H04N 19/597;
(Continued)

(56) References Cited

U.S. PATENT DOCUMENTS 10,424,083 B2 * 9/2019 Sinharoy ................ G06T 9/001
2014/0267616 A1   9/2014 Krig
(Continued)

FOREIGN PATENT DOCUMENTS

EP   3457688 A1   3/2019
EP   3474562 A1   4/2019
(Continued)

OTHER PUBLICATIONS

Salahieh et al., "Test Model for Immersive Video", International Organization for Standardization, ISO/IEC JTC 1/SC 29/WG 11, Coding of Moving Pictures and Audio, Document: N18470, Geneva, Switzerland, March (Year: 2019).*

(Continued)

*Primary Examiner* — Xiao Liu
(74) *Attorney, Agent, or Firm* — Condo Roccia Koptiw LLP

(57) ABSTRACT

Methods, devices and streams are disclosed for encoding a depth atlas representative of the geometry of a volumetric video. Views to be encoded are analyzed to detect regions of the views with simple depth or color, that is regions for which the depth or color has a local variance lower than a given threshold. Resolution of such regions is reduced and the atlas comprises first regions in full resolution and downscaled second regions. Metadata indicating whether a patch is a downscaled region and, if so the downscaling (Continued)

factor, are associated with the atlas in the data stream. The decoder uses these metadata to compose the view from different patches.

14 Claims, 6 Drawing Sheets

(51) Int. Cl.
  *H04N 19/182* (2014.01)
  *H04N 19/186* (2014.01)
  *H04N 19/30* (2014.01)
  *H04N 19/597* (2014.01)

(52) U.S. Cl.
  CPC ........... *H04N 19/186* (2014.11); *H04N 19/30* (2014.11); *H04N 19/597* (2014.11)

(58) Field of Classification Search
  CPC ........... H04N 21/816; H04N 21/85406; H04N 13/161; H04N 13/178; H04N 13/194; H04N 19/46; H04N 19/70
  See application file for complete search history.

(56) References Cited

U.S. PATENT DOCUMENTS

| | | | |
|---|---|---|---|
| 2019/0371051 A1 | 12/2019 | Dore et al. | |
| 2019/0373287 A1 | 12/2019 | Lim et al. | |
| 2021/0006834 A1* | 1/2021 | Salahieh | H04N 19/597 |
| 2021/0067757 A1* | 3/2021 | Yun | H04N 13/282 |
| 2022/0345756 A1* | 10/2022 | Kroon | H04N 21/21805 |

FOREIGN PATENT DOCUMENTS

| | | |
|---|---|---|
| KR | 10-2018-0028299 A | 3/2018 |
| KR | 10-2019-0105011 A | 9/2019 |

OTHER PUBLICATIONS

Homayouni et al, Content adaptive depth map resampling scheme in multiview video plus depth, 2014 IEEE International Symposium on Circuits and Systems (ISCAS), pp. 538-541 (Year: 2014).*

Boyce et al, "Working Draft 2 of Metadata of Immersive Video", International Organization for Standardization, ISO/IEC JTC1/SC29/WG11, Document MPEG2018/M18576, Gothenburg, Sweden, Jul. 2019, 38 pages.

Boyce et al, "Depth Coding for Immersive Video", International Organization for Standardization, ISO/IEC JTC1/SC29/WG11, Document: MPEG2019/M49342, Gothenburg, Sweden, 6 pages.

Salahieh et al., "Test Model for Immersive Video", International Organisation for Standardisation, ISO/IEC JTC 1/SC29/WG 11, Coding of Moving Pictures and Audio, Document: N18470, Geneva, Switzerland, Mar. 2019, 27 pages.

Anonymous, "High Efficiency Video Coding", ITU-T Telecommunication Standardization Sector of ITU, Series H: Audiovisual and Multimedia Systems, Infrastructure of audiovisual services—Coding of moving video, Recommendation ITU-T H.265, Feb. 2018, pp. 1-692.

Anonymous, "Information Technology—Coding of Audio-Visual Objects—Part 10: Advanced Video Coding", International Standard, ISO/IEC 14496-10, Second Edition, Oct. 1, 2004, 280 pages.

Anonymous, "Terminal Equipment and Protocols for Telematic Services", Information Technology—Digital Compression and Coding of Continuous-Tone Still images—Requirements and Guidelines, International Telecommunication Union (ITU), The International Telegraph and Telephone Consultative Committee (CCITT), Document: T.81, Sep. 1992, 186 pages.

ITU_T, "Advanced video coding for generic audiovisual services", ITU-T H.264, International Telecommunication Union, ITU-T Telecommunication Standardization Sector of ITU, Series H: Audiovisual and Multimedia Systems, Infrastructure of Audiovisual Services—Coding of Moving Video, Jan. 2012, pp. 1-680.

ITU-T, "High Efficiency Video Coding", Recommendation ITU-T H.265, Series H: Audiovisual and Multimedia Systems, Infrastructure of Audiovisual Services—Coding of Moving Video, Oct. 2014, 540 pages.

* cited by examiner

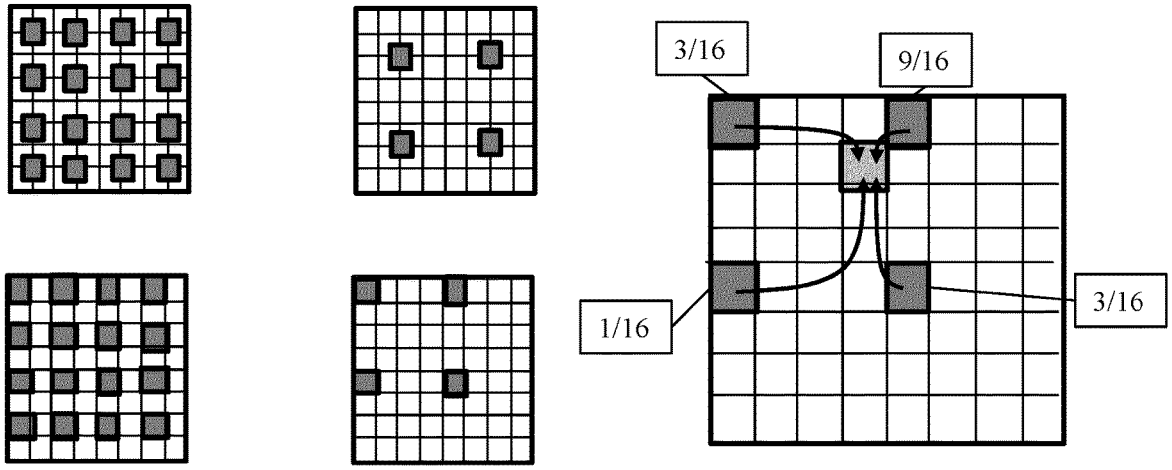
Figure 11
Figure 12
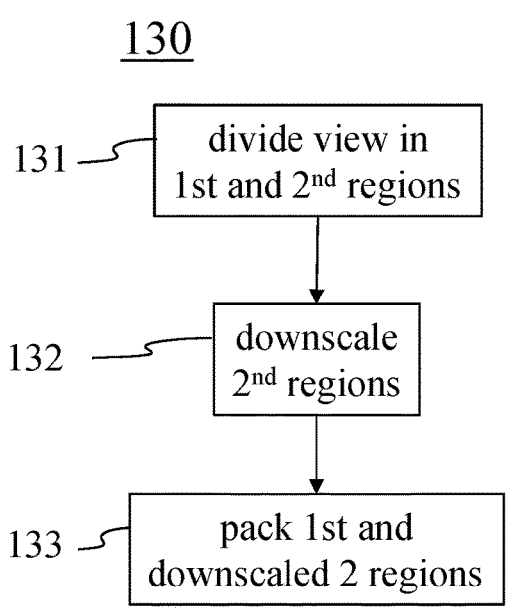
Figure 13
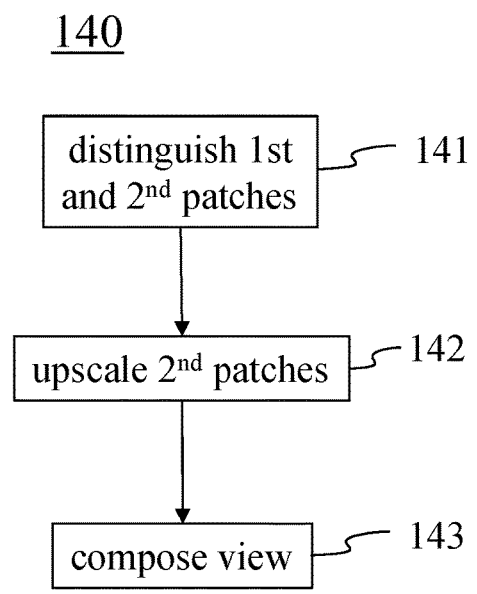
Figure 14

METHOD AND APPARATUS FOR ENCODING, TRANSMITTING AND DECODING VOLUMETRIC VIDEO

CROSS REFERENCE TO RELATED APPLICATIONS

This application is a U.S. National Stage Application under 35 U.S.C. § 371 of International Patent Application No. PCT/EP2020/077103, filed Sep. 28, 2020, which is incorporated herein by reference in its entirety.

This application claims the benefit of European Patent Application No. 19306264.3, filed Oct. 2, 2019, which is incorporated herein by reference in its entirety.

TECHNICAL FIELD

The present principles generally relate to the domain of three-dimensional (3D) scene and volumetric video content. The present document is also understood in the context of the encoding, the formatting and the decoding of data representative of the texture and the geometry of a 3D scene for a rendering of volumetric content on end-user devices such as mobile devices or Head-Mounted Displays (HMD).

BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Recently there has been a growth of available large field-of-view content (up to 360°). Such content is potentially not fully visible by a user watching the content on immersive display devices such as Head Mounted Displays, smart glasses, PC screens, tablets, smartphones and the like. That means that at a given moment, a user may only be viewing a part of the content. However, a user can typically navigate within the content by various means such as head movement, mouse movement, touch screen, voice and the like. It is typically desirable to encode and decode this content.

Immersive video, also called 360° flat video, allows the user to watch all around himself through rotations of his head around a still point of view. Rotations only allow a 3 Degrees of Freedom (3DoF) experience. Even if 3DoF video is sufficient for a first omnidirectional video experience, for example using a Head-Mounted Display device (HMD), 3DoF video may quickly become frustrating for the viewer who would expect more freedom, for example by experiencing parallax. In addition, 3DoF may also induce dizziness because of a user never only rotates his head but also translates his head in three directions, translations which are not reproduced in 3DoF video experiences.

A large field-of-view content may be, among others, a three-dimension computer graphic imagery scene (3D CGI scene), a point cloud or an immersive video. Many terms might be used to design such immersive videos: Virtual Reality (VR), 360, panoramic, 4π steradians, immersive, omnidirectional or large field of view for example.

Volumetric video (also known as 6 Degrees of Freedom (6DoF) video) is an alternative to 3DoF video. When watching a 6DoF video, in addition to rotations, the user can also translate his head, and even his body, within the watched content and experience parallax and even volumes. Such videos considerably increase the feeling of immersion and the perception of the scene depth and prevent from dizziness by providing consistent visual feedback during head translations. The content is created by the means of dedicated sensors allowing the simultaneous recording of color and depth of the scene of interest. The use of rig of color cameras combined with photogrammetry techniques is a way to perform such a recording, even if technical difficulties remain.

While 3DoF videos comprise a sequence of images resulting from the un-mapping of texture images (e.g. spherical images encoded according to latitude/longitude projection mapping or equirectangular projection mapping), 6DoF video frames embed information from several points of views. They can be viewed as a temporal series of point clouds resulting from a three-dimension capture. Two kinds of volumetric videos may be considered depending on the viewing conditions. A first one (i.e. complete 6DoF) allows a complete free navigation within the video content whereas a second one (aka. 3DoF+) restricts the user viewing space to a limited volume called viewing bounding box, allowing limited translation of the head and parallax experience. This second context is a valuable trade-off between free navigation and passive viewing conditions of a seated audience member.

3DoF+ contents may be provided as a set of Multi-View+ Depth (MVD) frames. A 3DoF+ encoder takes as input a multiview+depth video, removes inter-views redundancy (this step is called 'pruning process') and packs the selected color and depth patches (i.e. information remaining after the pruning) into multiple atlases (i.e. images gathering pictures extracted from the pruned MVD). The bitstream consists of multiple streams (e.g. HEVC streams) carrying the atlases of texture (i.e. color) and depth patches, accompanied by metadata describing the camera parameters of input views and the atlases layouts. In known formats, the patch atlases consist of pairs of texture and depth atlas components, with same picture size and same layout (same packing) for texture and depth. Such a representation with identical packing and same spatial resolution for texture and depth patches is sub-optimal. The geometry of 3D scenes exhibits large zones with flat or low varying depth and/or texture. There is a lack of a solution for taking advantage of this feature of volumetric videos.

SUMMARY

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles relate a method for encoding a view in an atlas, the method comprising:
 dividing said view in first regions and second regions, a second region being a candidate for subsampling;
 downscaling resolution of second regions by a factor;
 packing first regions and downscaled second region in said atlas in association with metadata indicating whether a patch is a first region or a downscaled second region and, if so, indicating the factor used for the downscaling of the resolution.

The present principles also relate to a device comprising a processor configured for implementing this method.

The present principles also relate to a method for decoding a view from an atlas comprising patches, the method comprising:

obtaining metadata indicating whether a patch is a first patch or a second patch and, if so, indicating a downscaling factor;

upscaling resolution of second patches according to associated said downscaling factor; and composing said view from said first patches and upscaled second patches The present principles also relate to a device comprising a processor configured for implementing this method.

BRIEF DESCRIPTION OF DRAWINGS

The present disclosure will be better understood, and other specific features and advantages will emerge upon reading the following description, the description making reference to the annexed drawings wherein:

FIG. 11 illustrates a regular subsampling in both horizontal and vertical directions, according to a non-limiting embodiment of the present principles;

FIG. 12 illustrates an example of bilinear up-sampling of patches transmitted with a different resolution, according to a non-limiting embodiment of the present principles;

FIG. 13 illustrates a method for encoding a depth view an atlas of depth patches according to a non-limiting embodiment of the present principles; and FIG. 14 illustrates a method for decoding a depth view from an atlas of depth patches according to a non-limiting embodiment of the present principles.

DETAILED DESCRIPTION

Figure 1:
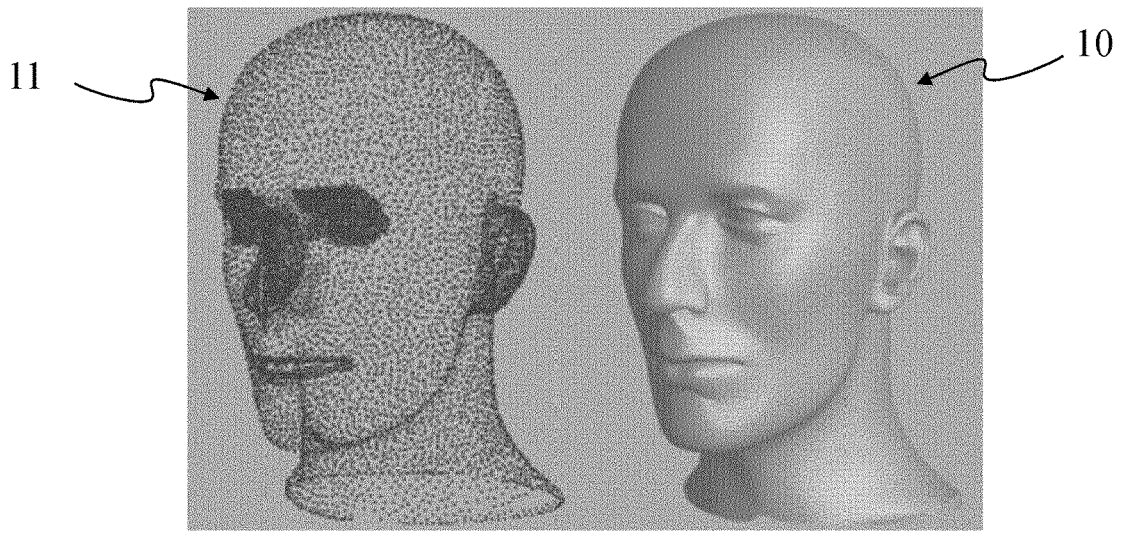
FIG. 1 shows a three-dimension (3D) model of an object and points of a point cloud corresponding to the 3D model, according to a non-limiting embodiment of the present principles.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims. While not explicitly described, the present examples and variants may be employed in any combination or sub-combination.

FIG. 1 shows a three-dimension (3D) model 10 of an object and points of a point cloud 11 corresponding to 3D model 10. 3D model 10 and the point cloud 11 may for example correspond to a possible 3D representation of an object of the 3D scene comprising other objects. Model 10 may be a 3D mesh representation and points of point cloud 11 may be the vertices of the mesh. Points of point cloud 11 may also be points spread on the surface of faces of the mesh. Model 10 may also be represented as a splatted version of point cloud 11, the surface of model 10 being created by splatting the points of the point cloud 11. Model 10 may be represented by a lot of different representations such as voxels or splines. FIG. 1 illustrates the fact that a point cloud may be defined with a surface representation of a 3D object and that a surface representation of a 3D object may be generated from a point of cloud. As used herein, projecting points of a 3D object (by extension points of a 3D scene) onto an image is equivalent to projecting any representation of this 3D object, for example a point cloud, a mesh, a spline model or a voxel model.

A point cloud may be represented in memory, for instance, as a vector-based structure, wherein each point has its own coordinates in the frame of reference of a viewpoint (e.g. three-dimensional coordinates XYZ, or a solid angle and a distance (also called depth) from/to the viewpoint) and one or more attributes, also called component. An example of component is the color component that may be expressed in various color spaces, for example RGB (Red, Green and Blue) or YUV (Y being the luma component and UV two chrominance components). The point cloud is a representation of a 3D scene comprising objects. The 3D scene may be seen from a given viewpoint or a range of viewpoints. The point cloud may be obtained by many ways, e.g.:
- from a capture of a real object shot by a rig of cameras, optionally complemented by depth active sensing device;
- from a capture of a virtual/synthetic object shot by a rig of virtual cameras in a modelling tool;
- from a mix of both real and virtual objects.

A 3D scene, in particular when prepared for a 3DoF+ rendering may be represented by a Multi-View+Depth (MVD) frame. A volumetric video is then a sequence of MVD frames. In this approach, the volumetric information is conveyed as a combination of color and depth patches stored in corresponding color and depth atlases which are then video encoded making use of regular codecs (typically HEVC). Each combination of color and depth patches typically represents a subpart of the MVD input views and the set of all patches is designed at the encoding stage to cover the entire scene while being as less redundant as possible. At the decoding stage, the atlases are first video decoded and the patches are rendered in a view synthesis process to recover the viewport associated to a desired viewing position.

Figure 2:
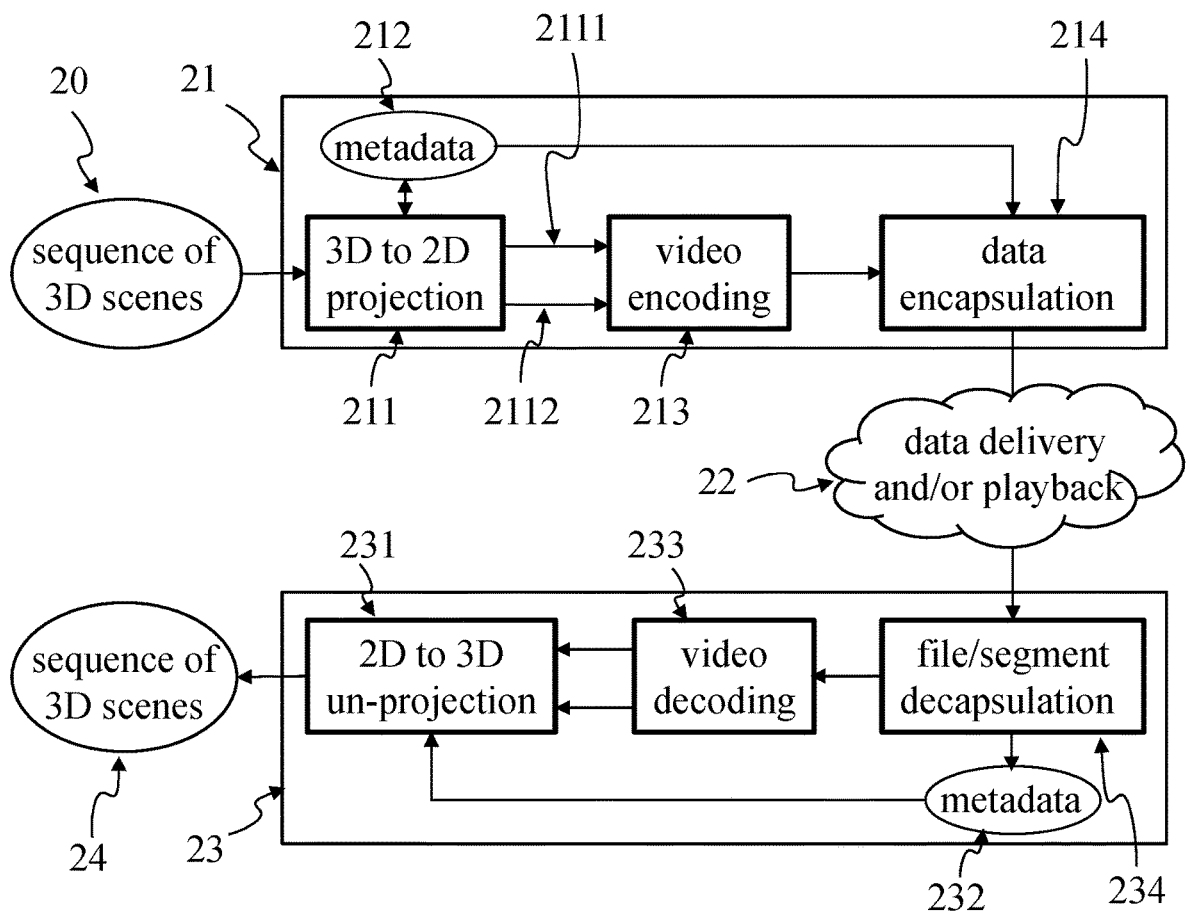
FIG. 2 shows a non-limitative example of the encoding, transmission and decoding of data representative of a sequence of 3D scenes, according to a non-limiting embodiment of the present principles.

FIG. 2 shows a non-limitative example of the encoding, transmission and decoding of data representative of a sequence of 3D scenes. The encoding format that may be, for example and at the same time, compatible for 3DoF, 3DoF+ and 6DoF decoding.

A sequence of 3D scenes 20 is obtained. As a sequence of pictures is a 2D video, a sequence of 3D scenes is a 3D (also called volumetric) video. A sequence of 3D scenes may be provided to a volumetric video rendering device for a 3DoF, 3Dof+ or 6DoF rendering and displaying.

Sequence of 3D scenes 20 is provided to an encoder 21. The encoder 21 takes one 3D scenes or a sequence of 3D scenes as input and provides a bit stream representative of the input. The bit stream may be stored in a memory 22 (and/or on an electronic data medium) and may be transmitted over a network. The bit stream representative of a sequence of 3D scenes may be read from a memory 22 and/or received from a network by a decoder 23. Decoder 23 is inputted by said bit stream and provides a sequence of 3D scenes, for instance in a point cloud format.

Encoder 21 may comprise several circuits implementing several steps. In a first step, encoder 21 projects each 3D scene onto at least one 2D picture. 3D projection is any method of mapping three-dimensional points to a two-dimensional plane. As most current methods for displaying graphical data are based on planar (pixel information from several bit planes) two-dimensional media, the use of this type of projection is widespread, especially in computer graphics, engineering and drafting. Projection circuit 211 provides at least one two-dimensional frame 2111 for a 3D scene of sequence 20. Frame 2111 comprises color information and depth information representative of the 3D scene projected onto frame 2111. In a variant, color information and depth information are encoded in two separate frames 2111 and 2112.

Metadata 212 are used and updated by projection circuit 211. Metadata 212 comprise information about the projection operation (e.g. projection parameters) and about the way color and depth information is organized within frames 2111 and 2112 as described in relation to FIGS. 5 to 7.

A video encoding circuit 213 encodes sequence of frames 2111 and 2112 as a video. Pictures of a 3D scene 2111 and 2112 (or a sequence of pictures of the 3D scene) is encoded in a stream by video encoder 213. Then video data and metadata 212 are encapsulated in a data stream by a data encapsulation circuit 214.

Encoder 213 is for example compliant with an encoder such as:
- JPEG, specification ISO/CEI 10918-1 UIT-T Recommendation T.81, www.itu.int/rec/T-REC-T.81/en;
- AVC, also named MPEG-4 AVC or h264. Specified in both UIT-T H.264 and ISO/CEI MPEG-4 Part 10 (ISO/CEI 14496-10), www.itu.int/rec/T-REC-H.264/en, HEVC (its specification is found at the ITU website, T recommendation, H series, h265, www.itu.int/rec/T-REC-H.265-201612-I/en);
- 3D-HEVC (an extension of HEVC whose specification is found at the ITU website, T recommendation, H series, h265, www.itu.int/rec/T-REC-H.265-201612-I/en annex G and I);
- VP9 developed by Google;
- AV1 (AOMedia Video 1) developed by Alliance for Open Media; or Future standards like Versatile Video Coder or MPEG-I or MPEG-V future versions.

The data stream is stored in a memory 22 that is accessible, for example through a network, by a decoder 23. Decoder 23 comprises different circuits implementing different steps of the decoding. Decoder 23 takes a data stream generated by an encoder 21 as an input and provides a sequence of 3D scenes 24 to be rendered and displayed by a volumetric video display device, like a Head-Mounted Device (HMD). Decoder 23 obtains the stream from a source, such as memory 22. For example, the source belongs to a set comprising:
- a local memory, e.g. a video memory or a RAM (or Random-Access Memory), a flash memory, a ROM (or Read Only Memory), a hard disk;
- a storage interface, e.g. an interface with a mass storage, a RAM, a flash memory, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth® interface); and
- a user interface such as a Graphical User Interface enabling a user to input data.

Decoder 23 comprises a circuit 234 for extract data encoded in the data stream. Circuit 234 takes a data stream as input and provides metadata 232 corresponding to metadata 212 encoded in the stream and a two-dimensional video. The video is decoded by a video decoder 233 which provides a sequence of frames. Decoded frames comprise color and depth information. In a variant, video decoder 233 provides two sequences of frames, one comprising color information, the other comprising depth information. A circuit 231 uses metadata 232 to un-project color and depth information from decoded frames to provide a sequence of 3D scenes 24. Sequence of 3D scenes 24 corresponds to sequence of 3D scenes 20, with a possible loss of precision related to the encoding as a 2D video and to the video compression.

Figure 3:
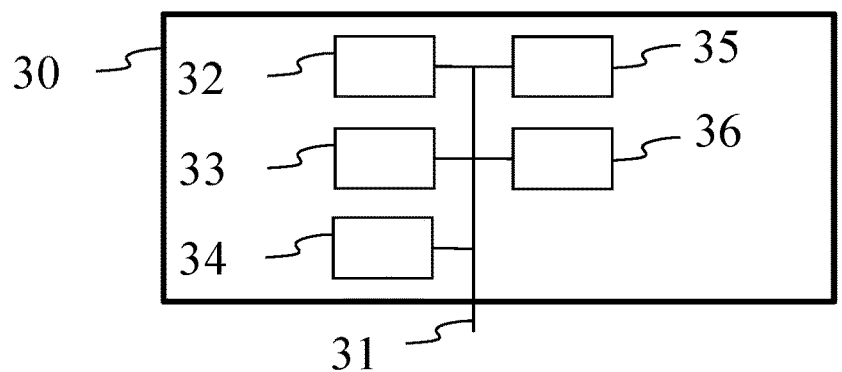
FIG. 3 shows an example architecture of a device which may be configured to implement a method described in relation with FIGS. 13 and 14, according to a non-limiting embodiment of the present principles.

FIG. 3 shows an example architecture of a device 30 which may be configured to implement a method described in relation with FIGS. 13 and 14. Encoder 21 and/or decoder 23 of FIG. 2 may implement this architecture. Alternatively, each circuit of encoder 21 and/or decoder 23 may be a device according to the architecture of FIG. 3, linked together, for instance, via their bus 31 and/or via I/O interface 36.

Device 30 comprises following elements that are linked together by a data and address bus 31:
- a microprocessor 32 (or CPU), which is, for example, a DSP (or Digital Signal Processor);
- a ROM (or Read Only Memory) 33;
- a RAM (or Random Access Memory) 34;
- a storage interface 35;
- an I/O interface 36 for reception of data to transmit, from an application; and
- a power supply, e.g. a battery.

In accordance with an example, the power supply is external to the device. In each of mentioned memory, the word «register» used in the specification may correspond to area of small capacity (some bits) or to very large area (e.g. a whole program or large amount of received or decoded data). The ROM 33 comprises at least a program and parameters. The ROM 33 may store algorithms and instructions to perform techniques in accordance with present principles. When switched on, the CPU 32 uploads the program in the RAM and executes the corresponding instructions.

The RAM 34 comprises, in a register, the program executed by the CPU 32 and uploaded after switch-on of the device 30, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with examples, the device 30 is configured to implement a method described in relation with FIGS. 13 and 14, and belongs to a set comprising:
- a mobile device;
- a communication device;
- a game device;
- a tablet (or tablet computer);
- a laptop;
- a still picture camera;
- a video camera;
- an encoding chip;
- a server (e.g. a broadcast server, a video-on-demand server or a web server).

Figure 4:
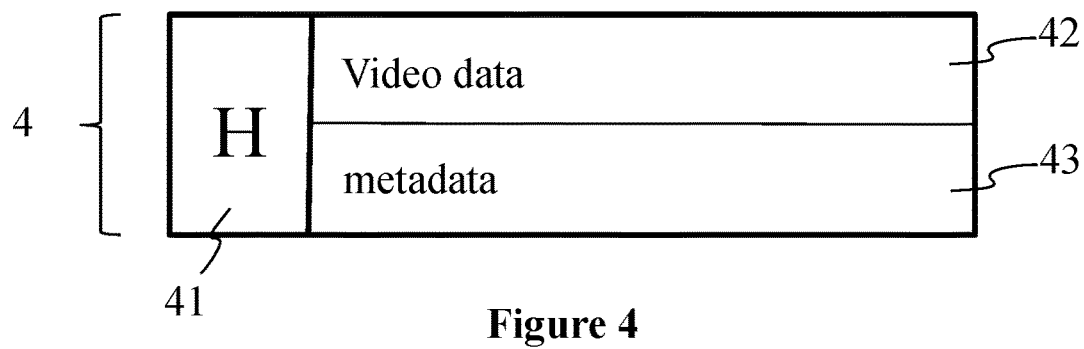
FIG. 4 shows an example of an embodiment of the syntax of a stream when the data are transmitted over a packet-based transmission protocol, according to a non-limiting embodiment of the present principles.

FIG. 4 shows an example of an embodiment of the syntax of a stream when the data are transmitted over a packet-based transmission protocol. FIG. 4 shows an example structure 4 of a volumetric video stream. The structure consists in a container which organizes the stream in independent elements of syntax. The structure may comprise a header part 41 which is a set of data common to every syntax elements of the stream. For example, the header part comprises some of metadata about syntax elements, describing the nature and the role of each of them. The header part may also comprise a part of metadata 212 of FIG. 2, for instance the coordinates of a central point of view used for projecting points of a 3D scene onto frames 2111 and 2112. The structure comprises a payload comprising an element of syntax 42 and at least one element of syntax 43. Syntax element 42 comprises data representative of the color and depth frames. Images may have been compressed according to a video compression method.

Element of syntax 43 is a part of the payload of the data stream and may comprise metadata about how frames of element of syntax 42 are encoded, for instance parameters used for projecting and packing points of a 3D scene onto frames. Such metadata may be associated with each frame of the video or to group of frames (also known as Group of Pictures (GoP) in video compression standards).

Figure 5:
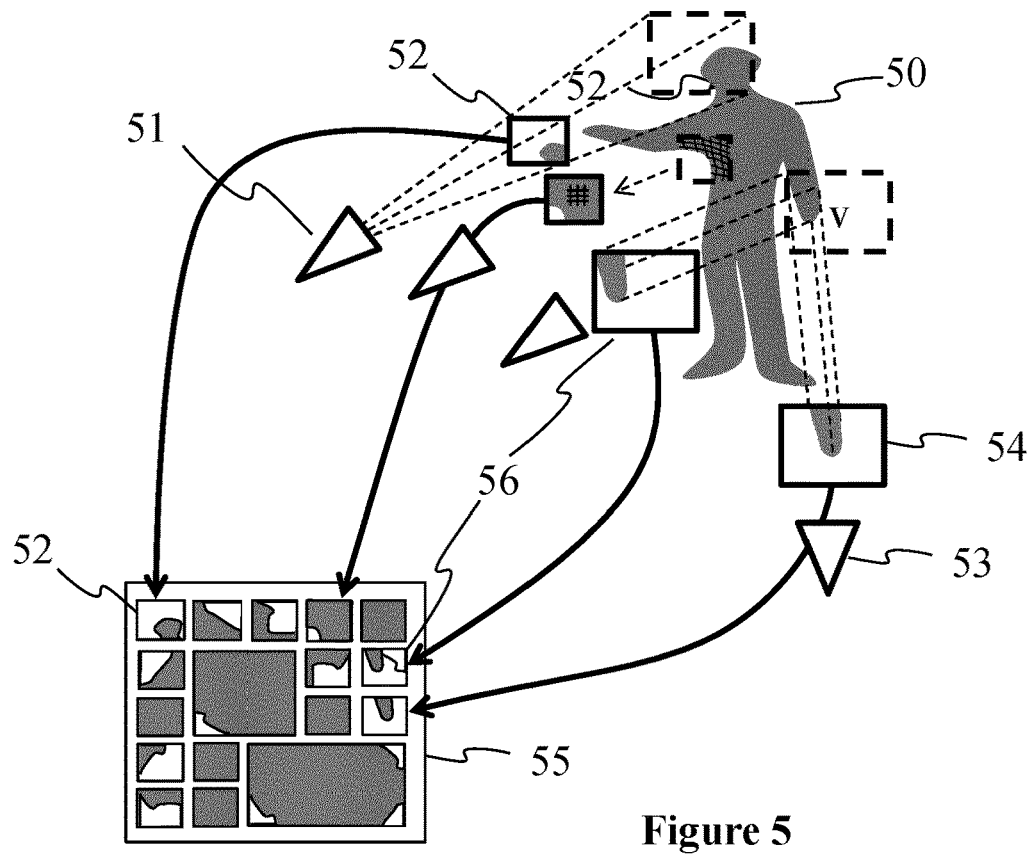
FIG. 5 illustrates the patch atlas approach with an example of 4 projection centers, according to a non-limiting embodiment of the present principles.

FIG. 5 illustrates the patch atlas approach with an example of 4 projection centers. 3D scene 50 comprises a character. For instance, center of projection 51 is a perspective camera and camera 53 is an orthographic camera.

Cameras may also be omnidirectional cameras with, for instance a spherical mapping (e.g. Equi-Rectangular mapping) or a cube mapping. The 3D points of the 3D scene are projected onto the 2D planes associated with virtual cameras located at the projection centers, according to a projection operation described in projection data of metadata. In the example of FIG. 5, projection of the points captured by camera 51 is mapped onto patch 52 according to a perspective mapping and projection of the points captured by camera 53 is mapped onto patch 54 according to an orthographic mapping.

The clustering of the projected pixels yields a multiplicity of 2D patches, which are packed in a rectangular atlas 55. The organization of patches within the atlas defines the atlas layout. In an embodiment, two atlases with identical layout: one for texture (i.e. color) information and one for depth information. Two patches captured by a same camera or by two distinct cameras may comprise information representative of a same part of the 3D scene, like, for instance patches 54 and 56.

The packing operation produces a patch data for each generated patch. A patch data comprises a reference to a projection data (e.g. an index in a table of projection data or a pointer (i.e. address in memory or in a data stream) to a projection data) and information describing the location and the size of the patch within the atlas (e.g. top left corner coordinates, size and width in pixels). Patch data items are added to metadata to be encapsulated in the data stream in association with the compressed data of the one or two atlases.

Figure 6:
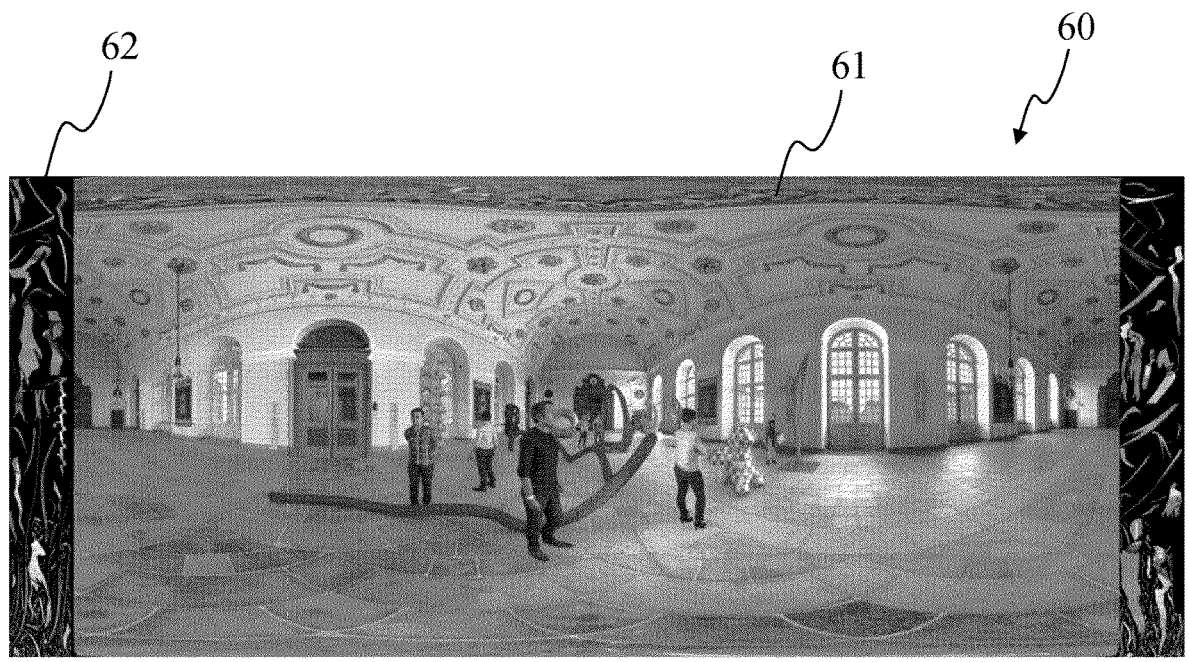
FIG. 6 shows an example of an atlas comprising the texture information of the points of a 3D scene, according to a non-limiting embodiment of the present principles.

FIG. 6 shows an example of an atlas 60 comprising the texture information (e.g. RGB data or YUV data) of the points of a 3D scene, according to a non-limiting embodiment of the present principles. As explained in relation to FIG. 5, an atlas is an image packing patches, a patch being a picture obtained by projecting a part of the points of the 3D scene.

In the example of FIG. 6, atlas 60 comprises a first part 61 comprising the texture information of the points of the 3D scene that are visible from a point of view and one or more second parts 62. The texture information of first part 61 may for example be obtained according to an equirectangular projection mapping, an equirectangular projection mapping being an example of spherical projection mapping. In the example of FIG. 6, the second parts 62 are arranged at the left and right borders of first part 61 but the second parts may be arranged differently. Second parts 62 comprise texture information of parts of the 3D scene that are complementary to the part visible from the point of view. The second parts may be obtained by removing from the 3D scene the points that are visible from the first viewpoint (the texture of which being stored in the first part) and by projecting the remaining points according to the same point of view. The latter process may be reiterated iteratively to obtain at each time the hidden parts of the 3D scene. According to a variant, the second parts may be obtained by removing from the 3D scene the points that are visible from the point of view, for example a central point of view, (the texture of which being stored in the first part) and by projecting the remaining points according to a point of view different from the first point of view, for example from one or more second point of view of a space of view centred onto the central point of view (e.g. the viewing space of a 3DoF rendering).

First part 61 may be seen as a first large texture patch (corresponding to a first part of the 3D scene) and the second parts 62 comprises smaller textures patches (corresponding to second parts of the 3D scene that are complementary to the first part). Such an atlas has the advantage to be compatible at the same time with 3DoF rendering (when rendering only first part 61) and with 3DoF+/6DoF rendering.

Figure 7:
FIG. 7 shows an example of an atlas comprising the depth information of the points of the 3D scene of FIG. 6, according to a non-limiting embodiment of the present principles.

FIG. 7 shows an example of an atlas 70 comprising the depth information of the points of the 3D scene of FIG. 6, according to a non-limiting embodiment of the present principles. Atlas 70 may be seen as the depth image corresponding to texture image 60 of FIG. 6.

Atlas 70 comprises a first part 71 comprising the depth information of the points of the 3D scene that are visible from the central point of view and one or more second parts 72. Atlas 70 may be obtained in a same way as atlas 60 but contains the depth information associated with the points of the 3D scene instead of the texture information.

For 3DoF rendering of the 3D scene, only one point of view, typically the central point of view, is considered. The user may rotate his head in three degrees of freedom around the first point of view to watch various parts of the 3D scene, but the user cannot move this unique point of view. Points of the scene to be encoded are points which are visible from this unique point of view, and only the texture information is needed to be encoded/decoded for the 3DoF rendering. There is no need to encode points of the scene that are not visible from this unique point of view for a 3DoF rendering as the user cannot access to them.

With regard to 6DoF rendering, the user may move the viewpoint everywhere in the scene. In this case, it is required to encode every point (depth and texture) of the scene in the bitstream as every point is potentially accessible by a user who can move his/her point of view. At the encoding stage, there is no means to know, a priori, from which point of view the user will observe the 3D scene.

With regard to 3DoF+ rendering, the user may move the point of view within a limited space around a central point of view. This enables to experience parallax. Data representative of the part of the scene visible from any point of the space of view is to be encoded into the stream, including the data representative of the 3D scene visible according to the central point of view (i.e. first parts 61 and 71). The size and shape of the space of view may for example be decided and determined at the encoding step and encoded in the bitstream. The decoder may obtain this information from the bitstream and the renderer limits the space of view to the space determined by the obtained information. According to another example, the renderer determines the space of view according to hardware constraints, for example in relation to capabilities of the sensor(s) that detects the movements of the user. In such a case, if, at the encoding phase, a point visible from a point within the space of view of the renderer has not been encoded in the bitstream, this point will not be rendered. According to a further example, data (e.g. texture and/or geometry) representative of every point of the 3D scene is encoded in the stream without considering the rendering space of view. To optimize the size of the stream, only a subset of the points of the scene may be encoded, for instance the subset of points that may be seen according to a rendering space of view.

The patches are created to be sufficiently non-redundant and complementary. A process to generate patches from Multi-view+Depth (MVD) representation of a 3D scene consists in "pruning" the input source views to remove any redundant information. To do so, each input view (color+depth) are iteratively pruned one after the other. A set of unpruned views, called basic views, is first chosen among the source views and is fully transmitted. The set of remaining views, called additional views, is then iteratively processed to remove information (in terms of color and depth similarity) redundant with the basic views and with the already pruned additional view. Color or depth values of pruned pixels is replaced by a predetermined value, for example 0 or 255. For instance in FIGS. 6 and 7, central view 61+71 is a basic view. In other embodiments, an atlas may gather several basic views.

Figure 8:
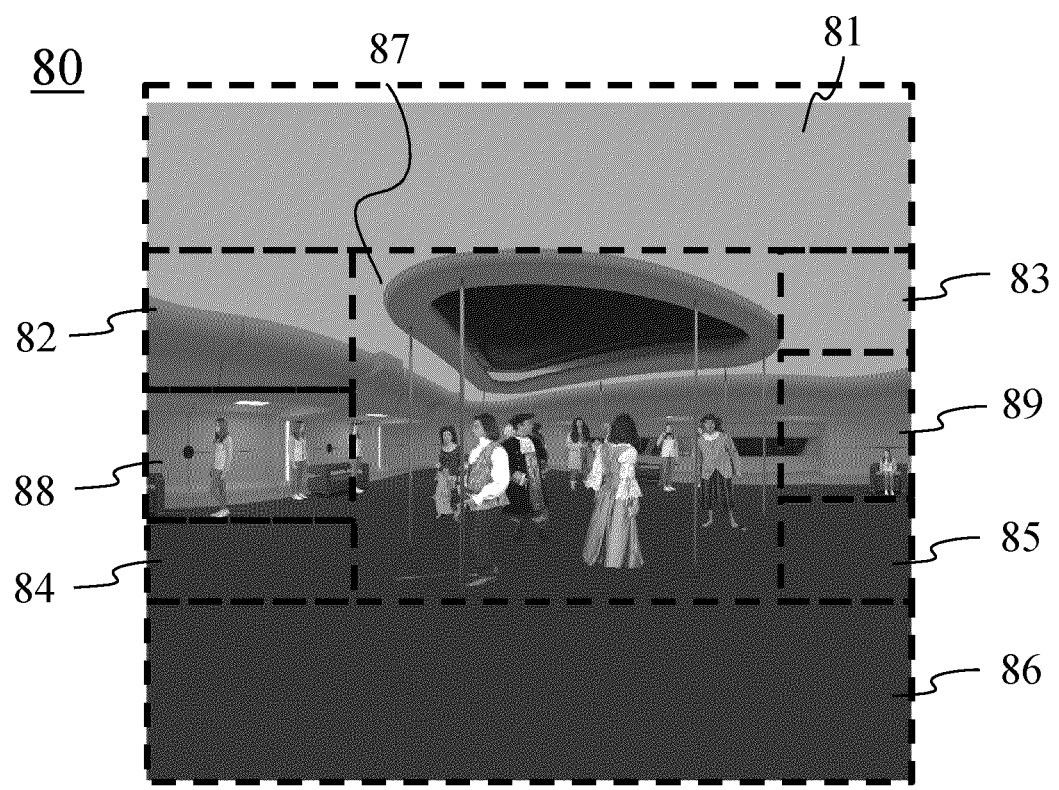
FIG. 8 illustrates a splitting of a basic view into areas according to characteristics of the depth information, according to a non-limiting embodiment of the present principles.

FIG. 8 illustrates a splitting of a basic view 80 into areas according to characteristics of the depth information. The geometry of scenes exhibits large areas for which the depth may be recovered from a sparse spatial sampling, at least with a spatial resolution significantly coarser than for the color component of the same area. In the example of FIG. 8, areas 81 to 86 are geometrically simple, for example, made of large flat surface. The depth of these parts does not need to be described with the same spatial resolution than the central parts 87 to 89 of the basic view which comprise volumes with complex geometry such as characters. A transport format for immersive video with separate packing for texture and depth patches, allowing selective sub-sampling of depth component of atlases with respect to the color component for some of the patches, is desirable. Such a format enables to design an encoding-decoding scheme with decreased pixel rate, especially for large field of view content, while yielding same bitrate versus distortion performance.

Figure 9:
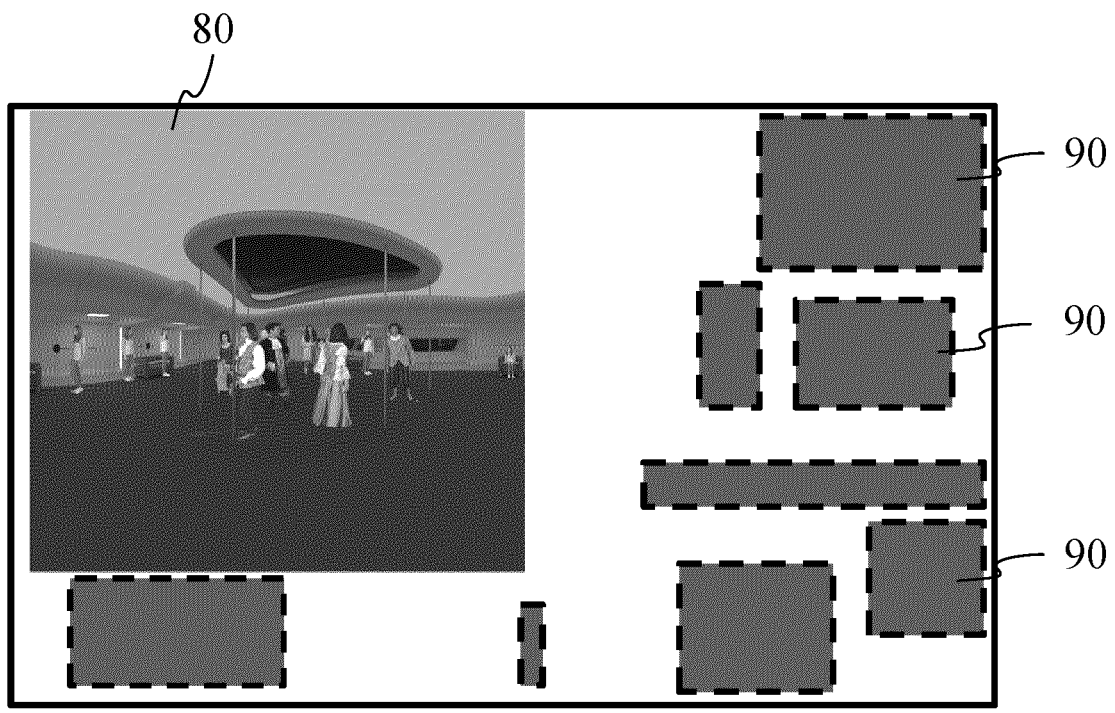
FIG. 9 shows an example color component of an atlas frame for the encoding of a 3D scene comprising basic view 80 of FIG. 8, according to a non-limiting embodiment of the present principles.

FIG. 9 shows an example color component of an atlas frame for the encoding of a 3D scene comprising basic view 80 of FIG. 8. The color component of the atlas frame comprises basic view 80 as a whole. Although it corresponds to a multiplicity of texture patches 81 to 89, these patches are organized seamlessly side by side in the texture atlas in order to form basic view 80 itself. Other patches 90, generated from the additional views (i.e. views which have been pruned to remove redundant information), are packed into the texture atlas (that is the color component of the atlas frame). Corresponding metadata are prepared to be encoded in the stream in association with the texture atlas.

Figure 10:
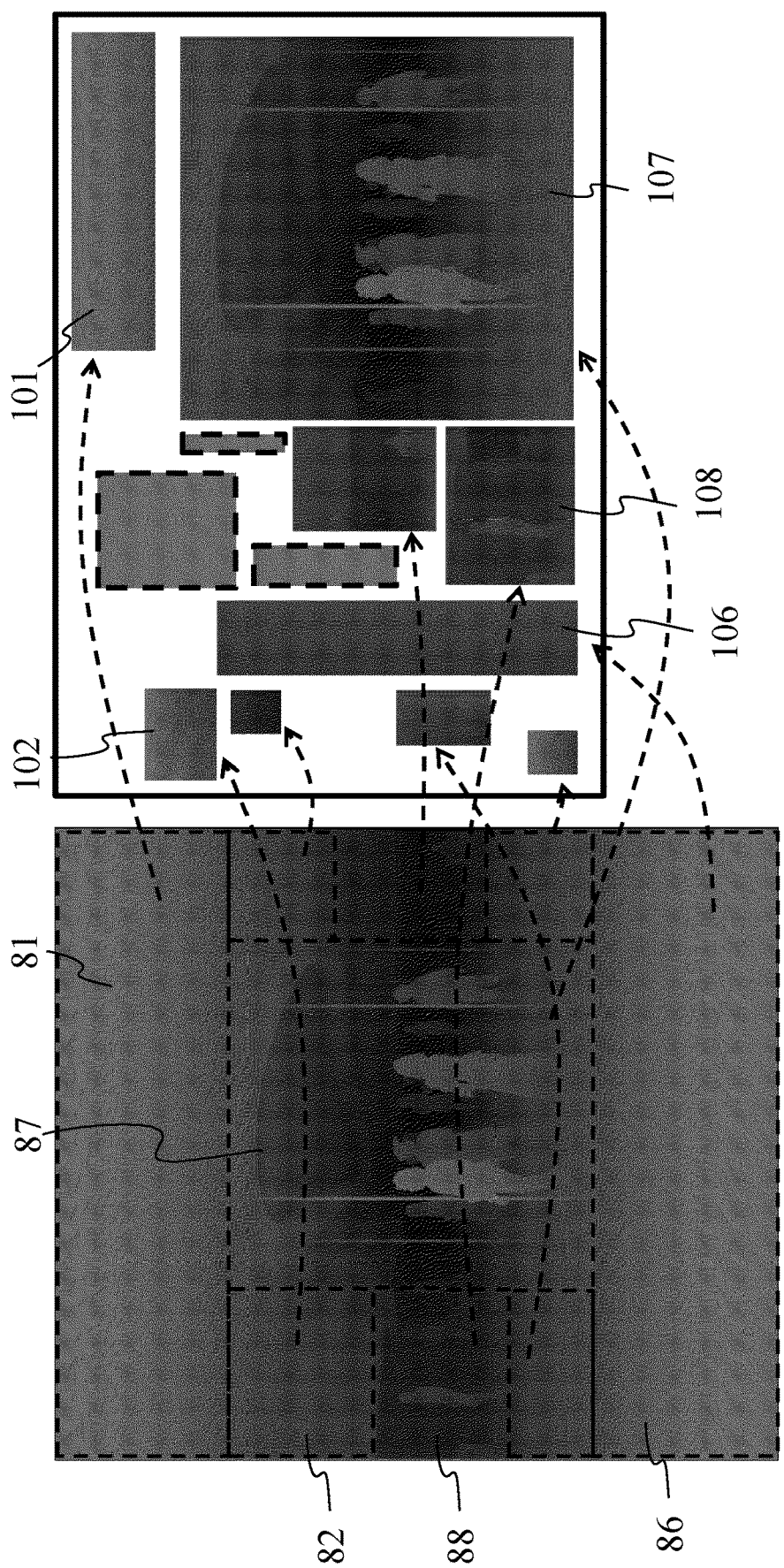
FIG. 10 shows an example depth component of an atlas frame for the encoding of a 3D scene comprising basic view 80 of FIG. 8, according to a non-limiting embodiment of the present principles.

FIG. 10 shows an example depth component of an atlas frame for the encoding of a 3D scene comprising basic view 80 of FIG. 8. The encoder is in charge to take the 3D scene, for example represented by a multiplicity of texture+depth inputs and to convert it into another composition of texture+depth pieces that is reduced in bitrate and pixel rate. It is advantageous for an encoder, as encoder 21 of FIG. 2, to select or regenerate very large portions of visual scene as full complete views, instead of splitting this scene into small pieces which are packed within an atlas. An operating mode of the encoder is to generate a full central view or to reuse an existing view of a MVD, which is referred to as a 'basic view'. In another operating mode, the encoder generates a plurality of full or almost full views, that is a plurality of basic views. The present principles are described with a unique basic view. However, it is straightforward to generalize to multiple basic views.

The basic view is analyzed by the encoder in order to select rectangular regions 81 to 86 where depth can be described in a more economical way from a transmission bitrate perspective and from a pixel rate perspective. By reducing the size taken by the depth patches in the depth atlas, this depth atlas is made smaller than the texture atlas. According to the present principles, three steps are implemented:

splitting the basic view into rectangular patches candidates for depth subsampling (81 to 86 in FIG. 8) and patches requiring full depth resolution (87 to 89 in FIG. 8). Candidates to spatial depth subsampling do not comprise 'invalid' pixels, that is pixels for which the depth information is undefined.

subsampling the depth patches which do not carry complex geometrical information while preserving the resolution of depth patches which carry complex geometrical information;

packing the resulting patches list in the depth atlas, taking benefit of the size reduction of many patches;

The splitting process is a constrained selection of image areas. Such methods are well-known in the state of the art. In an embodiment (also called quadtree approach), the method for selecting patches suitable for depth subsampling comprises recursively splitting the basic view into four quadrants and testing whether each quadrant is a planar surface, the depth map of which can be spatially subsampled without information loss. A pseudo code of such a method may be:

Step1: the initial patch is the basic view
    Step2: determine a histogram of depth values
    Step3: if the histogram peak is above a given threshold T1
        Stop: The patch is candidate for depth subsampling (constant depth)
    else
        Step 4: determine a normal direction in each point of the patch
        Step 5: determine an average normal direction
        Step 6: determine the histogram of angular distances with the average normal
        Step 7: if the histogram peak is above a given threshold T2
            Stop: The patch is candidate for depth subsampling (planar surface)
        else
            Step 8: split the patch into 4 quadrants
            Step 9: go to step 2 for each quadrant The following remarks apply:

a given maximum number of splits may be an additional stopping condition (i.e. a minimal patch size condition);
    in a simplified version steps 4 to 7 are omitted (only front-parallel depth planes are tested).

In the example of FIG. 10, the basic view is split in nine areas 81 to 89 as in FIG. 8. On one hand, for instance, regions 87 and 88 are identified as having a complex geometry and, for this reason, are kept in full resolution. Area 87 is packed in the depth atlas as patch 107 and area 88 as patch 108. In the depth atlas, patches relative to areas of the basic view are not necessarily organized side by side. Corresponding metadata are prepared to be stored in the stream in association with the depth atlas. On the other hand, for example, areas 81, 82 and 86 are identified as candidates to subsampling by the splitting process. As a result, a patch 101 is generated by downscaling the spatial resolution of area 81 and is packed in the depth atlas. Similarly, a patch 102 is generated for area 82 and a patch 106 for area 86. Metadata comprising information about the position of a patch in the atlas, the view it is generated from and parameters of the corresponding resolution downscaling are prepared to be stored in the stream in association with the depth atlas.

The present principles have efficient advantages when applied to a basic view. However, they may be applied to any kind of patches, even patches obtained by a pruning process. In an embodiment, the downscaling may be applied to color patches of FIG. 9. In this embodiment, color atlas and depth atlas have a different layout as there patches candidates to downscaling may be different for color domain and depth domain.

FIG. 11 illustrates a regular subsampling in both horizontal and vertical directions. In an embodiment, depth sub-sampling uses a same integer, for example a power of 2, as a factor along horizontal and vertical directions. The chosen subsampling factor is encoded in metadata to be signaled to the decoder. Example of horizontal and vertical subsampling by 2 and 4, as well as two possible different phases for the subsampled pixel grid are depicted in FIG. 11: horizontal and vertical decimation by 2 (at the left) or by 4 (at the right); placement of subsampled pixels shifted by half period (at the top) or aligned with source pixels (at the bottom).

To enable signalling of identical versus separate packing for depth and texture, as well as random signalling of patches with a decreased spatial resolution for the depth component with respect to the texture component, the following syntax is proposed:

|  | Descriptor |
|---|---|
| atlas_params_list( ) { |  |
|     num_atlases_minus1 | ue(v) |
|     omaf_v1_compatible_flag | u(1) |
|     for ( i = 0; i <= num_atlases_minus1; i++ ) { |  |
|         atlas_id[ i ] | u(8) |
|         different_texture_depth_packing_flag[ i ] | u(1) |
|         atlas_params( atlas_id[ i ], different_texture_depth_packing_flag [ i ]) |  |
|     } |  |
| } |  | different_texture_depth_packing_flag [i] being equal to 1 indicates that texture and depth patches are packed in a different way in the texture and depth components of the ith atlas, respectively.

|  | Descriptor |
|---|---|
| atlas_params( a, different_texture_depth_packing_flag) { |  |
|     num_patches_minus1[ a ] | u(16) |
|     atlas_width[ a ] | u(16) |
|     atlas_height[ a ] | u(16) |
|     if ( different_texture_depth_packing_flag ) { |  |
|         depth_atlas_width[ a ] | u(16) |
|         depth_atlas_height[ a ] | u(16) |
|     } |  |
|     for ( i = 0; i <= num patches minus1; i++ ) { |  |
|         view_id a if i 1 | u(v) |
|         patch_width_in_view[a ][ i ] | u(v) |
|         patch_height_in_view[ a ][ i ] | u(v) |
|         patch_pos_in_atlas_x[ a ][ i ] | u(v) |
|         patch_pos_in_atlas_y[ a ][ i ] | u(v) |
|         patch_pos_in_view_x[ a ][ i ] | u(v) |
|         patch_pos_in_view_y[ a ][ i ] | u(v) |
|         patch_rotation[ a ][ i ] | u(3) |
|         if ( different_texture_depth_packing_flag ) { |  |
|             patch_pos_in_depth_atlas_x[ a ][ i ] | u(v) |
|             patch_pos_in_depth_atlas_y[ a ][ i ] | u(v) |
|             patch_rotation_in_depth_atlas[ a ][ i ] | u(3) |
|             log2_decimation factor[ a ][ i ] | u(2) |
|         } |  |
|     } |  |
| } |  |

If different_texture_depth_packing_flag is equal to 1, then there is no more alignment between the texture patch atlas and the depth patch atlas: different atlas dimensions, different packing. The following fields are added to atlas_params:

depth_atlas_width[a] and depth_atlas_height[a] indicates the width and the height of the a-th depth atlas, respectively.

patch_pos_in_depth_atlas_x[a][i] and patch_pos_in_depth_atlas_y[a][i] specify the horizontal and vertical coordinates in luma samples, respectively, of the top-left corner of the i-th patch of the a-th depth atlas. The number of bits used for the representation of patch_pos_in_depth_atlas_x[a][i] and patch_pos_in_depth_atlas_y[a][i] are Ceil (Log2(depth_atlas_width[a])) and Ceil(Log2(depth_atlas_height[a])), bits respectively.

patch_rotation_in_depth_atlas[a][i] has the same semantic for the rotation of a patch in a depth atlas as patch_rotation[a][i].

log2_decimation_factor[a][i] specifies by which power of two value the depth patch has been subsampled (in both horizontal and vertical directions) with respect to the texture patch. If two bits are used for this descriptor, the depth can be subsampled by 2, 4 or 8. Value 0 indicates that the patch is not subsampled.

FIG. 12 illustrates an example of bilinear up-sampling of patches transmitted with a different resolution. The depth patches which are transmitted in low resolution have to be up-converted in full spatial resolution at the decoder side. In an embodiment, up-conversion is performed by bilinear filtering. An example of bilinear up-sampling coefficients for 1:4 spatial up-conversion is depicted in FIG. 12.

FIG. 13 illustrates a method 130 for encoding a depth view an atlas of depth patches according to a non-limiting embodiment of the present principles. At a step 131, the depth view to encode is obtained from a source. The depth view is divided in rectangular first and second regions; second regions being candidate to depth subsampling. A region is candidate whether depth information of the region can be described in a more economical way from a transmission bitrate perspective and from a pixel rate perspective as described in relation to FIG. 10. At a step 132, resolution of second regions is downscaled by a factor. The factor is determined according to depth characteristics of the second region. At a step 133, the depth atlas is generated by packing first regions in full resolution and downscaled second regions, together with patches coming from other depth views on the 3D scene. Metadata indicating whether a patch is a first region or a downscaled second region and, if so, indicating the factor used for the downscaling of the resolution.

FIG. 14 illustrates a method 140 for decoding a depth view from an atlas of depth patches according to a non-limiting embodiment of the present principles. At a step 141, the depth atlas is obtained from a source and depth patches are extracted from the atlas in association with metadata indicating whether a patch is a first patch or a second patch and, if so, indicating a downscaling factor. At a step 142, resolution of patches of the second category is upscaled by the associated factor. At a step 143, the depth view is composed with the patches of the first category and the upscaled patches of the second category.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for encoding a depth view of a Multiview plus Depth frame (MVD) in an atlas of patches, a patch being a rectangular region of the depth view, the method comprising:
    dividing the depth view in first rectangular regions and second rectangular regions based on complexity of geometrical information within the rectangular regions, wherein the second rectangular regions are candidates for downscaling;
    downscaling a resolution of the second rectangular regions in a vertical direction by a vertical factor and in a horizontal direction by a horizontal factor to obtain downscaled second rectangular regions; and
    packing the first rectangular regions and the downscaled second rectangular regions in the atlas in association with metadata indicating for each patch of the atlas whether the patch is a first rectangular region or a downscaled second rectangular region and, if so, indicating the vertical factor and the horizontal factor used for the downscaling of the resolution.

2. The method of claim 1, wherein the vertical and horizontal factors are different for two second rectangular regions.

3. The method of claim 1, wherein every pixel of each second rectangular region has a valid depth value.

4. The method of claim 1, further comprising:
    encoding in a data stream, information indicating that patches have different resolution, the atlas, and the metadata.

5. A non-transitory computer readable medium storing instructions which, when executed by one or more processors, cause the one or more processors to perform the method of claim 1.

6. The method of claim 1, wherein the first rectangular regions are regions comprising complex geometrical information and the second rectangular regions are regions having a planar surface.

7. A device for encoding a depth view of a Multiview plus Depth frame (MVD) in an atlas of patches, a patch being a rectangular region of the depth view, the device comprising a processor configured to perform:
    dividing the depth view in first rectangular regions and second rectangular regions based on complexity of geometrical information within the rectangular regions, wherein the second rectangular regions are candidates for downscaling;
    downscaling a resolution of the second rectangular regions in a vertical direction by a vertical factor and in a horizontal direction by a horizontal factor to obtain downscaled second rectangular regions; and packing the first rectangular regions and the downscaled second rectangular regions in the atlas in association with metadata indicating for each patch of the atlas whether the patch is a first rectangular region or a downscaled second rectangular region and, if so, indicating the vertical factor and the horizontal factor used for the downscaling of the resolution.

8. The device of claim 7, wherein the vertical and horizontal factors are different for two second rectangular regions.

9. The device of claim 7, wherein every pixel of each second rectangular region has a valid depth value.

10. The device of claim 7, wherein the processor is further configured to encode in a data stream, information indicating that patches have different resolution, the atlas, and the metadata.

11. The device of claim 7, wherein the first rectangular regions are regions comprising complex geometrical information and the second rectangular regions are regions having a planar surface.

12. A method for decoding a depth view of a Multiview plus Depth frame (MVD) from an atlas packing patches, a patch being a rectangular region of the depth view, the method comprising:

obtaining metadata indicating for each patch of the atlas whether the patch is a first patch or a second patch being a downscaled rectangular region, and, if so, indicating a vertical factor and a horizontal factor, wherein the first patch is a rectangular region comprising complex geometrical information and the second patch is a rectangular region having a planar surface;

upscaling resolution of each second patch in a vertical direction by the vertical factor and in a horizontal direction by the horizontal factor; and composing the depth view from each first patch and each upscaled second patch.

13. A non-transitory computer readable medium storing instructions which, when executed by one or more processors, cause the one or more processors to perform the method of claim 12.

14. A device for decoding a depth view of a Multiview plus Depth frame (MVD) from an atlas packing patches, a patch being a rectangular region of the depth view, the device comprising a processor configured to perform:

obtaining metadata indicating for each patch of the atlas whether the patch is a first patch or a second patch being a downscaled rectangular region, and, if so, indicating a vertical factor and a horizontal factor, wherein the first patch is a rectangular region comprising complex geometrical information and the second patch is a rectangular region having a planar surface;

upscaling resolution of each second patch in a vertical direction by the vertical factor and in a horizontal direction by the horizontal factor; and composing the depth view from each first patch and each upscaled second patch.

* * * * *